Dec. 23, 1924.
E. H. ELZEMEYER ET AL
1,520,228
PULVERIZING MACHINE
Filed March 3, 1923
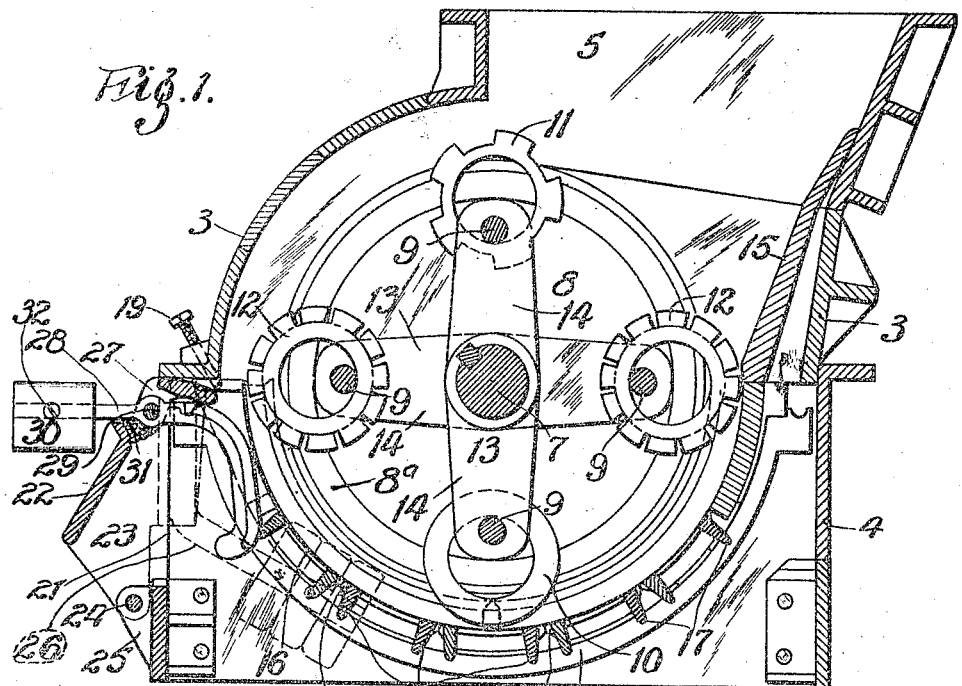
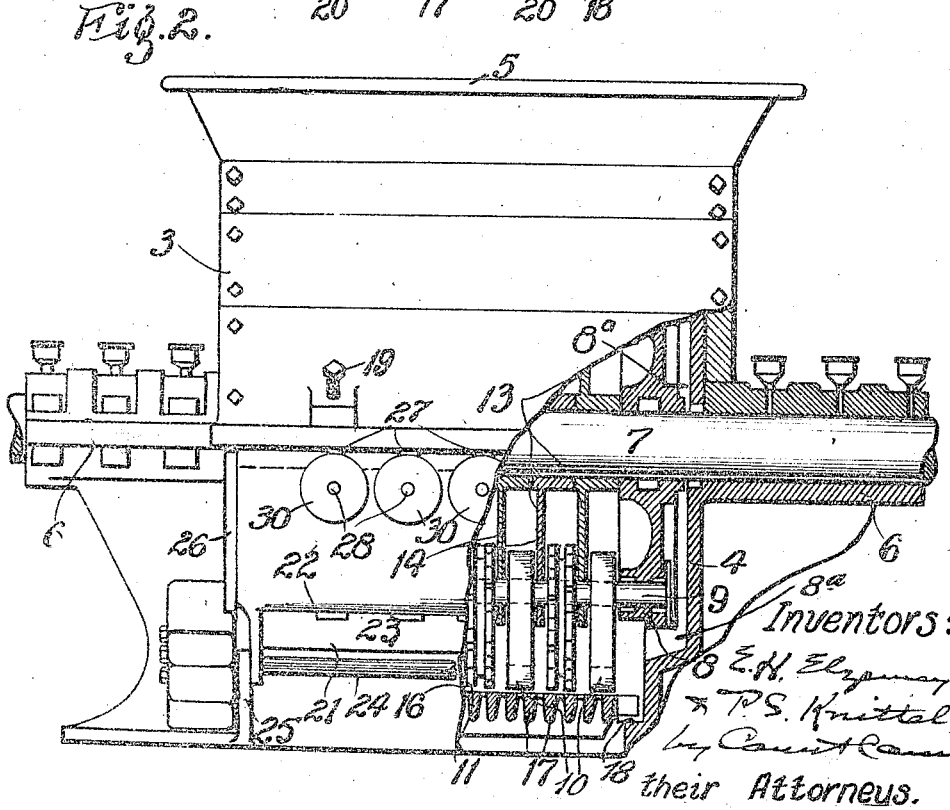
Inventors:
E. H. Elzemeyer
P. S. Knittel
their Attorneys.

Patented Dec. 23, 1924.

1,520,228

UNITED STATES PATENT OFFICE.

ERNST H. ELZEMEYER AND PAUL S. KNITTEL, OF ST. LOUIS, MISSOURI.

PULVERIZING MACHINE.

Application filed March 3, 1923. Serial No. 622,569.

*To all whom it may concern:*

Be it known that we, ERNST H. ELZEMEYER and PAUL S. KNITTEL, citizens of the United States, and residents of the city of St. Louis and State of Missouri, have invented a new and useful Improvement in Pulverizing Machines, of which the following is a specification.

This invention relates to rotary pulverizing machines. In the operation of such machines, pieces of metal or exceedingly hard substances are sometimes fed into the machine by accident and are liable to damage the same. Another disadvantage is that such machine is liable to become choked as the result of overfeeding, which necessitates the removal of the compacted material to enable the machine to operate successfully.

The principal object of the present invention is to provide for the automatic discharge of such excess and foreign materials which tend to damage the machine or interfere with the operation thereof. Other objects are simplicity and cheapness of construction and compactness of design.

The invention consists principally in a pulverizing machine wherein provision is made for the automatic discharge of such excess of foreign materials; and it also consists in the arrangements and combinations of parts hereinafter described and claimed.

In the accompanying drawing, wherein like numerals refer to like parts wherever they occur, Fig. 1 is a vertical transverse section through a pulverizer provided with an automatic discharge embodying our invention, and Fig. 2 is a rear elevation of the machine, partly in section.

Referring to the accompanying drawing, our device is illustrated in connection with a pulverizing machine comprising an upper casing 3, and a lower casing 4. The upper casing 3 is provided with a chute or hopper 5 through which the material to be pulverized is fed; and the lower section 4 has an open bottom through which the pulverized material is discharged. The side walls of the lower casing are provided with suitable bearing boxes 6 for rotatably supporting the ends of the main shaft 7.

Mounted on the shaft 7, in a circular recess 8ᵃ formed in each side wall of the pulverizer, are circular end plates or disks 8 which are connected to each other by a series of circumferentially spaced rods 9. Mounted on the rods 9 are grinding rings 10, ring hammers 11 and shredder rings 12. Mounted on the shaft 7, between the circular end plates 8, are spiders 13, the radially extending arms 14 of which are perforated to receive the supporting rods 9 and thus constitute supports for said rods intermediate their ends. The radially extending arms of the spiders also act as spacers for the different types of rings which are preferably arranged alternately on the supporting rods. This same arrangement of spacing is carried out in the angular spacing of the different types of rings on the supporting rods. The hub portions of the spiders are keyed to the shaft 7 and abut against each other, thereby spacing the arms of the spiders the desired distance apart.

The upper casing 3 is provided with a breaker plate 15; and the lower casing 4 supports the grinding concave 16 and grate bars 17 in close proximity to the paths of the outermost portions of the rings carried by the rods 9. The grinding concave and grate bars are supported at each end on arcuate flanges 18 that project laterally from the side walls of the lower casing. The grinding concave and the grate bars are clamped in place by means of screws 19 that engage the upper flanged ends of arcuate pieces whose lower ends bear against the extremities of the rearmost grate bar. The sides of the grate bars are provided with lugs 20 that serve to space them apart; and said grate bars are also provided with transverse openings whereby the pulverizer grate has openings that extend both longitudinally and transversely.

The rear end of the lower casing of the pulverizer is formed with an opening 21 which is provided with a hinged apron or gate 22 whose rear wall is inclined downwardly and rearwardly from the upper end of the gate and terminates short of the bottom thereof, thereby forming an opening 23. The gate extends from side to side of the pulverizer and is provided with end walls whose upper portions overlap the rear edge portion of the sides of the pulverizer and whose lower portions are mounted on horizontal pivots 24 supported in brackets 25 secured to the back of the casing adjacent to the opening therein, whereby said gate is adapted for vertical swinging movement toward and away from the pulverizer.

Angular brackets 26 have one arm riveted or otherwise rigidly secured to the end walls of the gate or hinged apron 22. The other arm of each bracket extends forwardly along side of each side wall of the casing and is provided with a series of counter-weights 25ª which have a counterbalancing effect on the gate and thereby serve to yieldably hold said gate in an upright or closed position against the lower casing 4. By this arrangement, the swinging of one or more of the fingers produces an opening for the discharge of the foreign matter, some of which will pass out through the opening 21. When large pieces pass through the finger openings and lodge, the gate 22 is swung open at the top and such lodged pieces are lifted out by means of tongs or other suitable means.

Extending through slots 27 provided therefor in the free upper end of the swinging apron 22 is a series of horizontally spaced levers 28. These levers are fulcrumed between their ends on pins 29 located in the slots in the hinged apron. The forwardly extending arms of the apron project into the pulverizer and are curved downwardly in close proximity to the paths of the outermost portions of the rings and thus constitute a grate section whose bars are independently yieldable. The outer arms of said levers project rearwardly and are provided with counter-weights 30 which have a counter-balancing effect on said levers and thus tend to swing the inner arms thereof towards the rings.

The inner arms of the levers 28 are adapted to be moved towards and away from the rings by means of adjusting screws 31 which are threaded into the hinged apron and engage the under sides of the outer arms of said levers. These screws serve also as adjustable stops for limiting the swinging movement of the inner arms of the levers in the direction of the rings. The amount of pressure required to overcome the counter-balancing effect of the weights on the outer arms of the levers or fingers is controlled by adjusting the slidably mounted counter-weights longitudinally of their supporting rods. The counter-weights are provided with screws 32 and are thus adapted to be locked in the desired adjusted position.

In the event that foreign material, such as pieces of metal or other exceedingly hard substances are fed into the pulverizer, such foreign material is engaged by the rings and carried around to the yieldable grate section formed by the curved inner ends of the pivotally mounted levers or fingers 28 and is thus forced against said fingers; whereupon one or more of said fingers are forced to move an amount sufficient to form an opening through which such substances are ejected from the grinding area of said pulverizer and fall to the bottom thereof.

In the event of overfeeding or overcrowding, the excess material causes an increased pressure on the fingers, thereby causing said fingers to move an amount sufficient to permit the discharge of the excess material from the grinding area. In the event that the amount of the excess material is sufficient to create a pressure on the fingers that will overcome the counterweighting effect of the counter-weights on the hinged apron, said apron will also swing outwardly a distance corresponding to the bulk of said excess material, some of which will be discharged from the pulverizer through the opening 23 in said hinged gate.

It is evident that changes may be made without departing from our invention and we do not wish to be limited to the precise construction shown and described. For instance, if desired, a counter-weighted grate section may be used instead of the series of independently counter-weighted fingers shown and described.

What we claim is:

1. A pulverizer comprising a casing having a grinding grate and rotary elements cooperating with said grate, said grinding grate comprising a stationary concave and a plurality of fingers at the rear end thereof arranged to yield under predetermined pressure of material that remains unground after traversing the stationary concave so as to discharge such unground material.

2. A pulverizer comprising a casing having a grinding grate and rotary elements cooperating with said grate, said grinding grate comprising a stationary concave and a plurality of fingers arranged adjacent to the rear end of said concave for independent yielding movement under predetermined pressure of material that remains unground after traversing the stationary concave so as to discharge such unground material.

3. A pulverizer comprising a casing having a grinding grate and rotary elements cooperating with said grate, said grinding grate comprising a stationary concave and a plurality of fingers at the rear end of said concave arranged to yield under predetermined pressure, and means on said fingers for varying the pressure under which they will yield.

4. A pulverizer comprising a casing having a grinding grate and rotary elements cooperating with said grate, said grate comprising a stationary concave and a plurality of fingers near the rear end thereof arranged to yield under predetermined pressure, means on said fingers for varying the pressure under which they will yield, and means for adjusting said fingers towards and away from said rotary elements.

5. A pulverizer comprising a casing having grinding surfaces and rotary elements cooperating with said surfaces, said grinding surfaces comprising a plurality of fingers arranged adjacent to their rear end to yield under predetermined pressure, means on said fingers for varying the pressure under which they will yield, and means for independently adjusting said fingers towards and away from said rotary elements, said adjusting means comprising an adjustable stop for limiting the movement of said fingers in the direction of said rotary elements.

6. A pulverizer comprising a casing having grinding surfaces and rotary elements cooperating with said surfaces, said grinding surfaces comprising a plurality of fingers near their rear end arranged to yield under predetermined pressure, means on said fingers for varying the pressure under which they will yield, means for independently adjusting said fingers towards and away from said rotary elements, said adjusting means comprising an adjustable stop for limiting the movement of said fingers in the direction of said rotary elements, and a yieldable support for said fingers, said support being adapted to yield under a predetermined pressure on said fingers.

7. In a pulverizer of the kind described, the combination with a casing having a grinding grate, of rotary grinding elements cooperating with said grinding grate, said grinding grate comprising a plurality of fingers arranged for yielding movement under certain pressures and automatic bodily movement under pressures greater than the pressures required to impart such yielding movement.

8. In a pulverizer of the kind described, the combination with a casing having a grinding grate and rotary elements cooperating with said grinding grate, said grinding grate comprising a stationary section and a plurality of fingers arranged for independent yielding movement under certain pressures and automatic joint bodily movement under pressures greater than the pressures required to impart such independent yielding movement.

9. A pulverizer comprising a casing having concave grinding surfaces comprising separate sections, and rotary grinding rings cooperating with said sections and mounted to be movable radially, the rearmost of said sections being arranged to yield automatically under predetermined pressure of material that traverses the preceding sections unground so as to discharge such unground material.

10. A pulverizer comprising a casing having grinding surfaces, rotary elements cooperating with said surfaces, a series of levers fulcrumed between their ends on said casing, one arm of a lever being disposed in cooperative relation with said rotary elements to constitute a grinding surface, and counter-weights mounted on the opposite arms of said levers for yieldably holding said first mentioned arms of said levers in cooperative relation to said rotary elements.

11. A pulverizer comprising a casing having grinding surfaces, rotary elements cooperating with said surfaces, a series of levers fulcrumed between their ends on said casing, one arm of a lever being disposed in cooperative relation with said rotary elements to constitute a grinding surface, counter-weights mounted on the opposite arms of said levers for yieldably holding said first mentioned arms of said levers in cooperative relation to said rotary elements, and a stop for limiting the movement of said first mentioned arms of said levers in the direction of said rotary elements.

12. A pulverizer comprising a casing having grinding surfaces, rotary elements cooperating with said surfaces, a series of levers fulcrumed between their ends on said casing, one arm of a lever being disposed in cooperative relation with said rotary elements to constitute a grinding surface, counter-weights mounted on the opposite arms of said levers for yieldably holding said first mentioned arms of said levers in cooperative relation to said rotary elements, and a stop for limiting the movement of said first mentioned arms of said levers in the direction of said rotary elements, said stop being adjustable whereby said first mentioned arms of said levers are adapted to be adjusted towards and away from said rotary elements.

13. A pulverizer comprising a casing having grinding surfaces, rotary elements cooperating with said surfaces, said casing being provided with an opening in its end wall, a hinged gate for said opening, counter-weights on said gate for yieldably holding the same in closed position, a series of levers fulcrumed between their ends on said gate, one arm of a lever being disposed in cooperative relation to said rotary elements to constitute a grinding surface, and counter-weights on the opposite arms of said levers for yieldably holding the first mentioned arms thereof in cooperative relation to said rotary elements.

Signed at St. Louis, Missouri, this 28th day of February, 1923.

ERNST H. ELZEMEYER.
PAUL S. KNITTEL.